G. A. CULBERTSON.
CULINARY-VESSELS.

No. 194,224.  Patented Aug. 14, 1877.

Attest
A. M. Warner
Edward Issen.

Inventor
Geo. A. Culbertson
by Wood & Boyd
Attorneys.

UNITED STATES PATENT OFFICE.

GEORGE A. CULBERTSON, OF KENTON COUNTY, KENTUCKY.

IMPROVEMENT IN CULINARY VESSELS.

Specification forming part of Letters Patent No. 194,224, dated August 14, 1877; application filed July 3, 1877.

*To all whom it may concern:*

Figure 1:
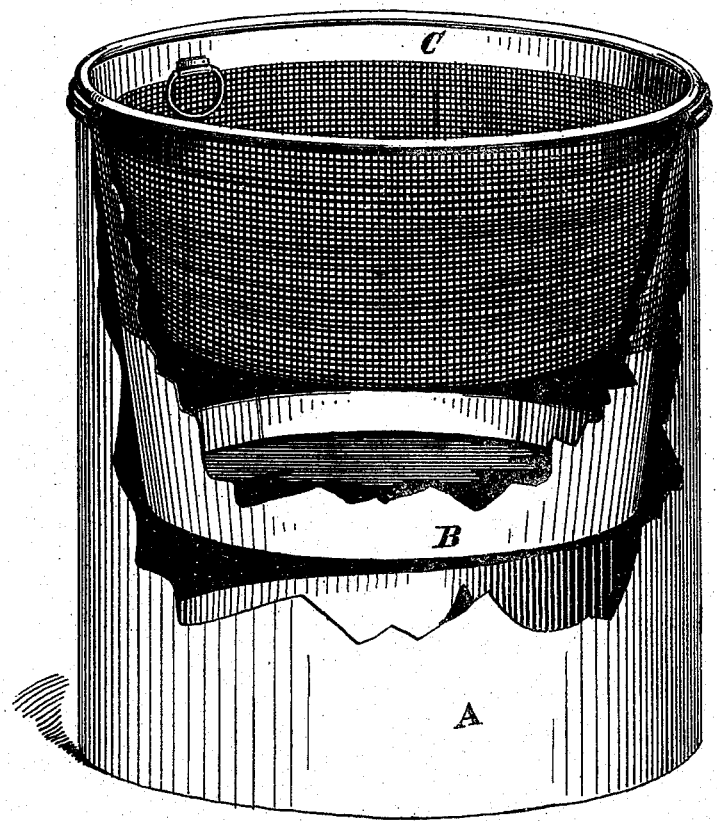
Figure 2:
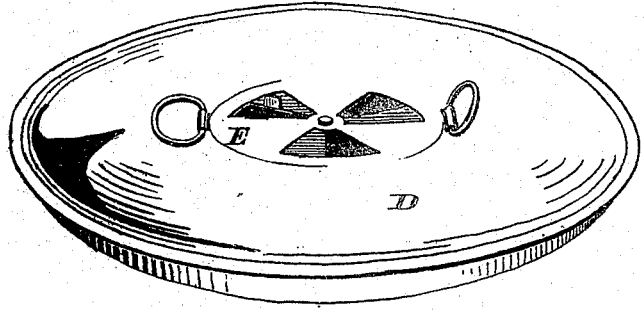

Be it known that I, GEORGE A. CULBERTSON, of the county of Kenton and State of Kentucky, have invented certain new and useful Improvements in Culinary Vessels, of which the following is a specification:

Figure 1 is a perspective view of the device with a portion broken away so as to show the interior. Fig. 2 represents the cover.

A represents a boiler, which may be made of any suitable material, and of any form and size desired.

B is a pan, having its bottom and sides for some distance up of solid metal, with wire-gauze, perforated metal, or arms connecting with the solid sides, for suspending it to the rim of the boiler within the same, as shown.

C represents another pan, having its bottom and sides of perforated tin or other suitable metal, and located within the pan B.

These three vessels are preferably made with rims to fit within and on each other in the order named, as shown in Fig. 1; but the inner pans may be suspended in any suitable manner without affecting the operation of the device, as hereinafter described.

D represents the lid, which is provided with steam-vents E, regulated by sliding valves.

The invention is designed, principally, for making jelly, and for preparing fruit for canning, and when used for these purposes, the operation is as follows: Sufficient water is put into the boiler A to supply the necessary steam to do the cooking. The fruit is placed in the upper perforated pan C, the whole being covered and placed over a fire. As the cooking progresses the jelly drops into pan B.

When it is desired to prepare the fruit for canning, it will, of course, only be left in long enough to be properly prepared for that purpose, and the quantity of jelly extracted will not be very great, but it will be very pure; and it is obvious that the quantity will always very much depend on the length of time the fruit is allowed to remain in the steamer.

Vegetables may be prepared for canning in the same way.

The device will also be found very useful in the cooking of meats and vegetables for immediate use, particularly where it is desired to give the natural flavor of a fruit to a cereal—as, for example, cooking rice in B and peaches in C.

Generally the operation may be performed with the lid tight; but when the fruit or vegetable is very succulent it is often desirable to open the valve E, so as to allow the steam to pass off.

Having thus described the invention, what I claim as new, and desire to secure by Letters Patent, is—

The combination, with the boiler A, of the partly solid jelly-pan B, suspended within the boiler, and the perforated fruit-pan C, suspended within the jelly-pan, the whole constructed to operate substantially as and for the purpose described.

In testimony whereof I have hereunto set my hand this 25th day of June, 1877.

G. A. CULBERTSON.

Witnesses:
 EDWARD BOYD,
 EDWARD ISSEN.